United States Patent [19]

Husher et al.

[11] Patent Number: 4,650,277

[45] Date of Patent: Mar. 17, 1987

[54] ROTATABLE OPTICAL IMAGING DEVICE FOR ALIGNING AND SWITCHING BETWEEN OPTICAL FIBERS

[75] Inventors: Frederick K. Husher, Forest Grove; Wesley C. Mickanin, Beaverton; Mike G. Brashler, Tigard, all of Oreg.

[73] Assignee: Tektronix, Inc., Beaverton, Oreg.

[21] Appl. No.: 602,244

[22] Filed: Apr. 20, 1984

[51] Int. Cl.⁴ .................. G02B 6/36; G01B 11/26; H01J 5/16

[52] U.S. Cl. .................. 350/96.20; 350/96.10; 350/96.15; 350/96.22; 350/96.21; 356/141; 356/152; 250/227

[58] Field of Search ............... 356/141, 152, 400, 401, 356/399, 153; 350/96.10, 96.15, 96.21, 96.20, 96.22, 96.25, 96.26, 6.1, 6.2, 6.5, 6.9, 6.91, 266, 269, 273, 275; 372/9, 14, 15, 16, 25, 29; 219/121 R, 121 EP, 121 EU, 121 EV, 121 EX, 121 L, 121 LA, 121 LU, 121 LW, 121 LX, 121 LG, 121 LH, 121.4; 250/227

[56] References Cited

U.S. PATENT DOCUMENTS

| | | | |
|---|---|---|---|
| 3,619,550 | 11/1971 | Matthews | 219/121 LU |
| 3,867,038 | 2/1975 | Westell | 356/172 |
| 3,938,895 | 2/1976 | Bridger et al. | 356/152 |
| 3,989,942 | 11/1976 | Waddoups | 356/152 X |
| 4,452,506 | 6/1984 | Reeve et al. | 350/96.20 |
| 4,472,052 | 9/1984 | Löfgren | 356/44 |
| 4,474,427 | 10/1984 | Hill et al. | 350/96.30 |
| 4,572,948 | 2/1986 | Brooks | 250/227 |
| 4,580,557 | 4/1986 | Hertzmann | 128/303.1 |

FOREIGN PATENT DOCUMENTS

| | | | |
|---|---|---|---|
| 55-77989 | 6/1980 | Japan | 219/121 LU |
| 57-85687 | 5/1982 | Japan | 219/121 LU |

Primary Examiner—James W. Davie
Assistant Examiner—Brian M. Healy
Attorney, Agent, or Firm—William S. Lovell; John Smith-Hill; John D. Winkelman

[57] ABSTRACT

An optical switching device selectively couples an optical port of a first type (e.g., an input port, at which a light beam is introduced into the apparatus) to one of at least two optical ports of a second type (e.g. output ports, from which a light beam leaves the apparatus) which are at predetermined, angularly-spaced positions about a central axis of the device. The device comprises an optical imaging device mounted to rotate about the central axis between a first position, in which the port of the first type is optically conjugate with one of the ports of the second type, and a second position, in which the port of the first type is optically conjugate with the other port of the second type. The device further comprising means for accurately determining whether the imaging device in its first position, and means for accurately rotating the imaging device about the central axis of the device through a predetermined angle corresponding to the angular spacing of the ports of the second type, whereby the imaging device is accurately placed in the second position.

9 Claims, 3 Drawing Figures

ROTATABLE OPTICAL IMAGING DEVICE FOR ALIGNING AND SWITCHING BETWEEN OPTICAL FIBERS

This invention relates to optical switching devices.

BACKGROUND OF THE INVENTION

In several applications, it is desirable to be able to select one of several optical paths for conveying a light beam. For example, in the conventional single lens reflex camera a mirror coupled to the shutter release is used selectively to direct the incoming light beam from a scene being photographed to the viewfinder or to permit the beam to strike the photographic emulsion. In the case of the SLR camera, where broad light beams are concerned, an error in positioning of the mirror or other optical switching element generally affects only the extreme edges of the beam and thus the means for mounting the mirror do not have to meet very strict criteria in this respect. In the case of a very narrow light beam, such as that which might be provided at the output of an optical fiber or which might need to be directed into an optical fiber or onto a photodetector, an error in positioning of the switching element would generally have much more serious consequences. It has hitherto been conventional to use an optical bench or other similarly massive device to ensure accurate positioning of an optical switching element used for directing a light beam selectively from a single source to one of several destinations or to select a single light beam, from several available beams, for directing towards a particular destination. However, an optical bench is inconvenient and does not lend itself well to incorporation in a portable instrument.

SUMMARY OF THE INVENTION

According to the present invention there is provided an optical switching apparatus for selectively coupling an optical port of a first type to one of at least two optical ports of a second type, one of said types being an input port, at which a light beam is introduced into the apparatus, and the other type being an output port, from which a light beam leaves the apparatus, the ports of the second type being at predetermined, angularly-spaced positions about a central axis of the apparatus, said apparatus comprising an optical imaging device mounted to rotate about said central axis between at least a first position, in which the port of the first type is optically conjugate with one of the ports of the second type, and a second position, in which the port of the first type is optically conjugate with the other port of the second type, and the apparatus also comprising means for accurately determining whether the imaging device is in said first position, and means for accurately rotating said imaging device about said central axis through a predetermined angle corresponding to the angular spacing of the ports of the second type, whereby the imaging device is accurately placed in said second position.

In a preferred embodiment of the invention, the ports of the second type are input ports and the port of the first type is an output port, and the apparatus serves to select one of several input light beams for directing to the output port, at which a photodetector is located. However, the invention could also be used to direct a single input light beam, received at the port of the first type, to one of several output ports.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
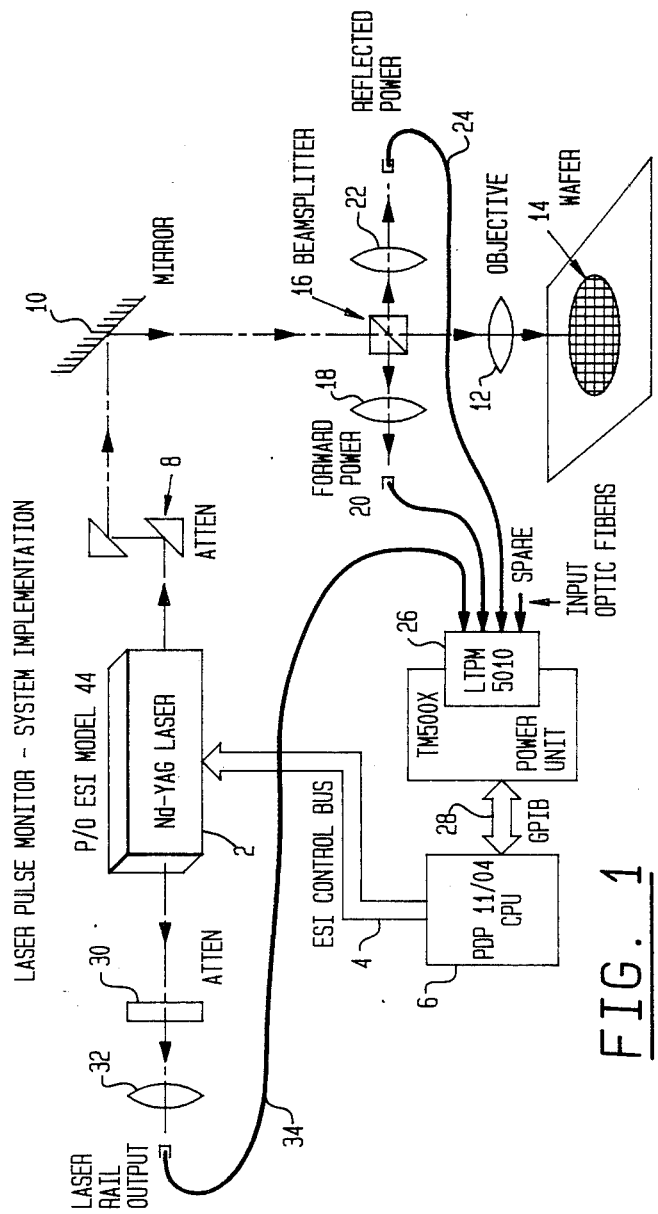
FIG. 1 illustrates, partly in block form, laser trim equipment including an optical switching apparatus embodying the present invention.

The laser trim apparatus illustrated in FIG. 1 comprises a laser light source 2 such as the ESI model 44 pulse output laser, which is controlled in known manner over a control bus 4 using a Digital Equipment Corporation PDP 11/04 central processing unit 6. The output light beam from the light source 2 is passed through an attenuator 8, comprising a pair of prism blocks, to a mirror 10, which directs the light beam vertically downwards towards an objective lens 12. Then lens 12 focuses the light beam onto a wafer 14 to be trimmed. The arrangement of the elements 2, 4, 6, 8, 10, 12 and 14 is well known.

Interposed between the mirror 10 and the objective 12 is a beam splitter 16. The beam splitter directs a portion of the light beam received from the mirror 10 to a lens 18, which focuses the light received from the beam splitter on the output to an optical fiber 20. The beam splitter 16 also receives light reflected from the wafer 14 through the objective lens 12, and directs a portion of this light into a lens 22, which focuses the light on the input of a second optical fiber 22. The optical fibers 20 and 24 are connected, at their ends remote from the lenses 18 and 22, to a laser pulse monitor 26, which is connected over an IEEE-488 General Purpose Interface Bus 28 to the CPU 6. The laser pulse monitor 26 develops information concerning the peak power, average power and repetition rate for the train of laser light pulses received at a selected input of the laser pulse monitor. The information obtained can be evaluated within the laser pulse monitor so as to enable the laser pulse monitor to provide control signals to the CPU 6 indicating that one or more of the parameters of the pulse train has exceeded a present limit. Alternatively, the information may be transmitted to the CPU in raw (unevaluated) form for manipulation by the CPU along with data collected from other sources on the laser system for characterization of the devices on the wafer 14.

Figure 2:
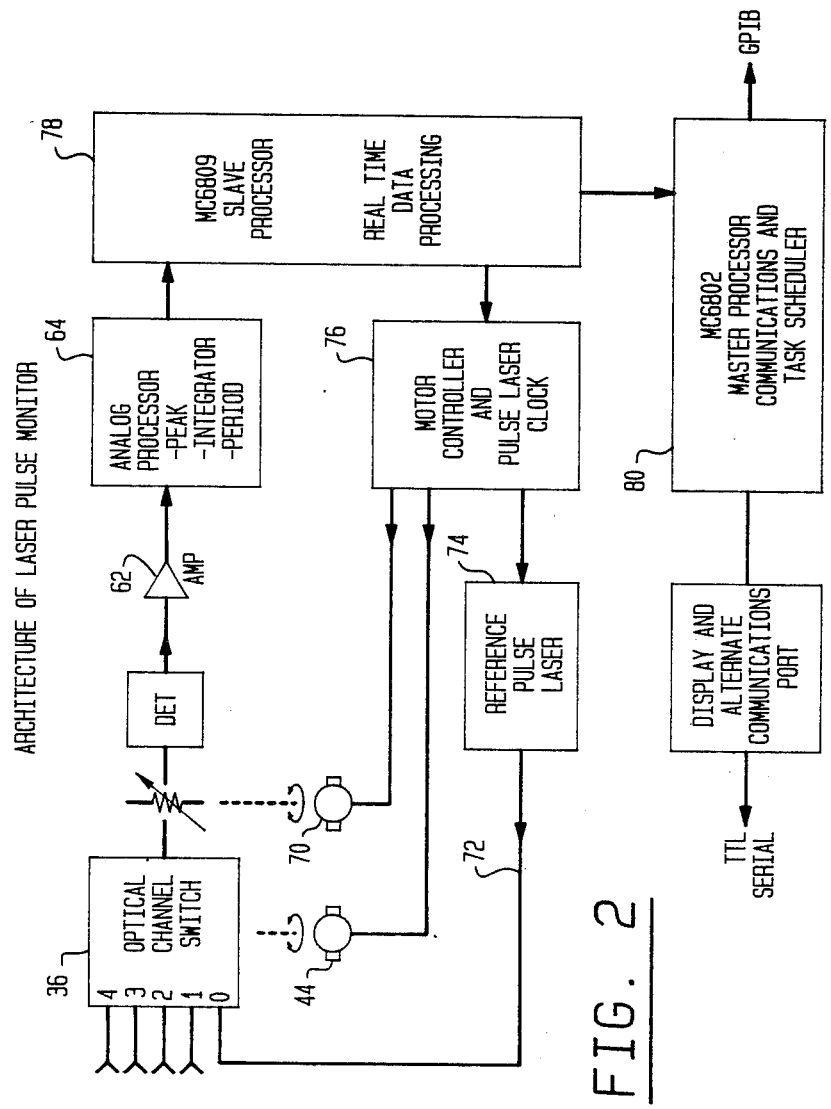
FIG. 2 illustrates the optical switching apparatus in greater detail.
Figure 3:
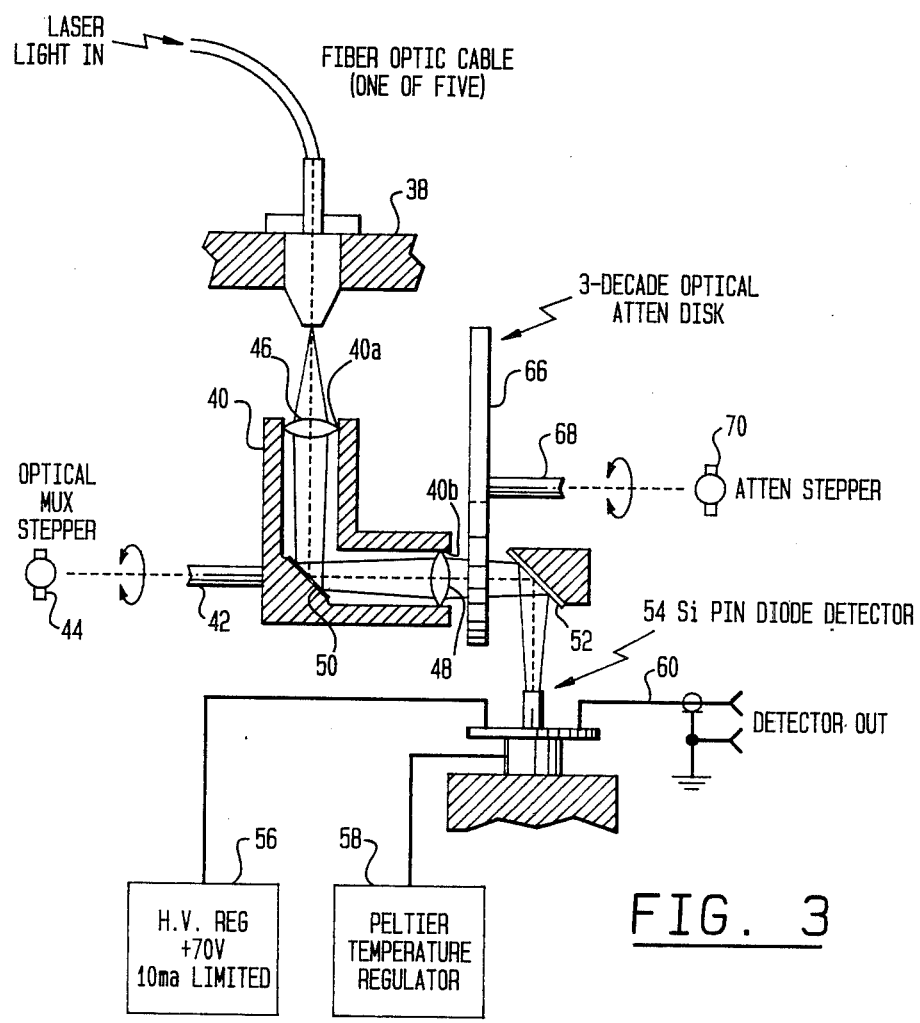
FIG. 3 is a cutaway view of part of the optical switching apparatus.

The laser pulse monitor 26 is illustrated in block form in FIG. 2, and a portion of the laser pulse monitor is illustrated in further detail in FIG. 3. The laser pulse monitor comprises an optical channel switch 36 having five optical inputs to which respective optical fibers can be attached. The optical channel switch 36 comprises a cylindrical housing 38 (only part of which is shown) having an imaging device 40 mounted therein. The imaging device 40 defines two cylindrical passages 40a and 40b disposed respectively radially of the housing 38 and axially thereof. The device 40 is mounted on a shaft 42 to rotate about the central axis of the housing 38 under control of a stepping motor 44.

The imaging device 40 comprises lenses 46 and 48 disposed in the cylindrical passages 40a and 40b respectively and having their optical axes disposed respectively radially of and coincident with the central axis of the housing 38. A mirror 50, disposed at 45 degrees to the central axis of the housing 38, brings the optical axes of the lenses 46 and 48 into optical coincidence.

Five fiber optical cables (the cables 20, 24, 34 and two additional cables) are connected to the pulse monitor 26 by way of connectors which are fitted in the wall of the housing 38 so that the exit apertures of the cables are disposed at the same position axially of the housing and are at substantially equal distances from the central axis of the housing 38. The five exit apertures are angularly spaced about the central axis of the housing, and are preferably equiangularly spaced about the central axis. The position of the exit apertures of the cables along the central axis of the housing is such that the exit apertures are swept by the optical axis of the lens 46 when the imaging device 40 is rotated.

A mirror 52 is associated with the imaging device. The mirror 52 is fixedly mounted in the housing 38 on the central axis thereof, disposed at 45 degrees to the axis. The mirror 52 is positioned to receive light which leaves the imaging device along the optical axis of the lens 48 and to reflect that light through an angle of 90 degrees, radially of the housing 38. Also mounted in the housing 38 is a photodetector 54, positioned to receive light reflected from the mirror 52. The focal lengths of the lenses 46 and 48, and the positions of those lenses, are such that the imaging device 40, depending on its angular position about the central axis of the housing 38, can image the exit aperture of any of the five fiber optic cables upon the photodetector.

The photodetector 54 comprises a silicon PIN diode which is connected to a regulated and current limited high voltage supply 56 and the temperature of which is regulated in known manner using a Peltier effect temperature regulator 58. The photodetector's output 60 is connected through an amplifier 62 (FIG. 2) to an analog processor 64.

Disposed between the imaging device 40 (FIG. 3) and the mirror 52 is a three-decade optical attenuation disc 66. The disc 66 is mounted on a shaft 68 for rotation about an axis parallel to the central axis of the housing 38 under control of a stepping motor 70.

One of the five optic fiber cables connected to the housing 38 is a fiber cable 72 (FIG. 2) which is connected to a reference pulse laser source 74. The reference pulse laser source, when activated, generates pulses of accurately predetermined amplitude and duration at an accurately predetermined frequency. Actuation of the reference pulse laser source 74 is controlled by a motor controller and pulse laser clock 76 which also controls the operation of the motors 44 and 70 and is itself controlled by a digital slave processor 78.

The analog processor 64 generates, from the signal received from the amplifier 62, an array of 12 bit digital words representing the peak power of each pulse incident on the photodetector, the time integral of the power and the interval between pulses.

It will be understood that the motor controller 76, by controlling the motor 44, is able to select among the several fiber optic cables which are connected to the pulse monitor 26. Thus, if the cable 20 is selected, the information provided by the analog processor 64 pertains to the light beam incident upon the wafer 14, whereas if the cable 24 is selected the information pertains to the light reflected from the wafer. In the event that the cable 34 is selected, the information pertains to the output light beam from the laser 2 before attenuation by the prism blocks 8.

In view of the samll size of the exit apertures of the fiber optic cables 20, 24 and 34, it is important that the imaging device 40 be accurately positioned. Moreover, it is necessary that the angular position of the attenuation disc 66 be accurately known. The reference laser pulse source 74, connected to the housing 38 by the fiber optic cable 72, is provided for this purpose. The laser pulse monitor is calibrated so that the output signal values provided by the analog processor 64 when the reference pulse laser 74 is on and the cable 72 is selected are known, and the motor controller and pulse laser clock 76 is used to turn on the laser 74 and control the motors 44 and 70 so as to position the imaging device 40 and the attenuation disc 66 to achieve the particular output signal values from the analog processor 64. At this point, it is known that the imaging device 40 is accurately positioned to select the cable 72 and that the attenuation disc 66 is set at its minimum attenuation position. The motor 44 is then able, under control of the motor controller to rotate the imaging device 40 through an integral multiple of 72 degrees with a high degree of accuracy, so as to select one of the other cables. Similarly, when it is known that the attenuation disc 66 is in its minimum attenuation position, it is possible to insure that the disc is accurately brought to a position having any desired degree of attenuation within its three decade range.

The digital slave processor 78 communicates with a master processor 80 which performs communications and task scheduling. The master processor 80 is connected through the general purpose interface bus 28 to the CPU 6. Thus, the laser pulse monitor closes the power level control loop of the laser source 2.

It will be appreciated by those skilled in the art that the laser pulse monitor 26 would normally be spaced at a considerable distance, e.g. 6 m, from the location of the beam splitter 16. It is for this reason that the optical channel switch 36 is used in conjunction with a single photodetector 54, instead of providing separate photodetectors associated with the lenses 18, 22 and 32 connected to an electrical multiplexer in the pulse monitor 26. Present electrical cables of the length involved in connecting the separate photodetectors to the electrical multiplexer would introduce excessive dispersion into the signal path leading to the electrical multiplexer, whereas presently available optical fiber cables are able to transmit the brief, high amplitude pulses transmitted by the lenses 18, 22 and 32 without introducing unacceptable dispersion.

It will be appreciated by those skilled in the art that the attenuation disc 66 is used to make maximum use of the dynamic range of the photodetector 54 while minimizing the risk of damage thereto.

It will be appreciated by those skilled in the art that the invention is not restricted to the particular apparatus that has been illustrated and described, since variations may be made therein without departing from the scope of the invention as defined in the appended claims, and equivalents thereof.

We claim:

1. Apparatus for selectively coupling one of at least two optical input ports, at which a light beam is introduced into the apparatus, to an optical output port, from which a light beam leaves the apparatus, the input ports being at predetermined, angularly-spaced positions about a central axis of the apparatus, said apparatus comprising an optical imaging device mounted to rotate about said central axis between a first position, in which the output port is optically conjugate with one of the input ports, and a second position, in which the output port is optically conjugate with the other input port, and the apparatus further comprising a reference light source coupled to said one input port, so that an accurate determination can be made as to whether the imaging device is in its first position by monitoring the level at which optical power is received at the output port, and means for accurately rotating said imaging device about said central axis through a predetermined angle corresponding to the angular spacing of the input ports.

2. Apparatus according to claim 1, comprising a housing defining a central axis and having a lateral wall in which said ports of the second type are located, and wherein said imaging device comprises a carrier member mounted to rotate about said central axis, a first lens mounted in the carrier member and having its axis coincident with said central axis, a second lens mounted in the carrier member at a position spaced from said central axis, and a reflector device mounted in the carrier member and bringing the optical axes of the first and second lenses into coincidence, said carrier member being mounted in said housing so that upon rotation of the housing the optical axis of the second lens sweeps said ports of the second type.

3. Apparatus according to claim 2, wherein said output is spaced from said central axis, and said imaging device comprises a second reflector mounted stationarily on said central axis for deflecting said optical axis from said central axis.

4. Apparatus according to claim 1, comprising a beam-modifying device positioned to intercept a light beam passing between any optical input ports of the and the optical port output, said beam modifying device being movable to adjust selectively its effect on a light beam passing therethrough, and the apparatus further comprising means for accurately moving said beam-modifying device to a predetermined position.

5. Apparatus according to claim 1, further comprising a photodetector coupled to the output port for providing an electrical signal representative of the level at which optical power is received at the output port.

6. Apparatus according to claim 1, wherein the reference light source is of predetermined optical power output.

7. Apparatus according to claim 6, further comprising a photodetector coupled to the output port for providing an electrical signal representative of the level at which optical power is received of the output port and means for comparing the level at which optical power is received at the output port with a predetermined optical power level.

8. Apparatus for selectively coupling an optical port of a first type to one of at least two optical ports of a second type, one of said types being an input port, at which a light beam is introduced into the apparatus, and the other type being an output port, from which a light beam leaves the apparatus, the ports of the second type being at predetermined, angularly spaced positions about a central axis of the apparatus, said apparatus comprising an optical imaging device mounted to rotate about said central axis between a first position, in which the port of the first type is optically conjugate with one of the ports of the second type, and a second position, in which the port of the first type is optically conjugate with the other port of the second type, and the apparatus further comprising a photodetector that provides an electrical signal representative of the level at which optical power is received by the photodetector, a reference light source and means for monitoring the electrical signal provided by the photodetector, the reference light source and the photodetector being optically coupled by way of the port of the first type, the optical imaging device and said one port of the second type when the imaging device is in its first postion, so that an accurate determination can be made as to error in the positioning of the imaging device by monitoring the level at which optical power is received by the photodetector, and the apparatus also comprising means for rotating said imaging device about said central axis through a predetermined angle corresponding to the angular spacing of the ports of the second type.

9. Apparatus according to claim 8, wherein the reference source is of a predetermined optical power output and the monitoring means are operative to compare the level at which optical power is received by the photodetector with a predetermined optical power level.

* * * * *